March 15, 1966   E. L. MORALES   3,240,261
THERMOELECTRIC APPARATUS AND METHOD
Filed Dec. 14, 1964   5 Sheets-Sheet 1
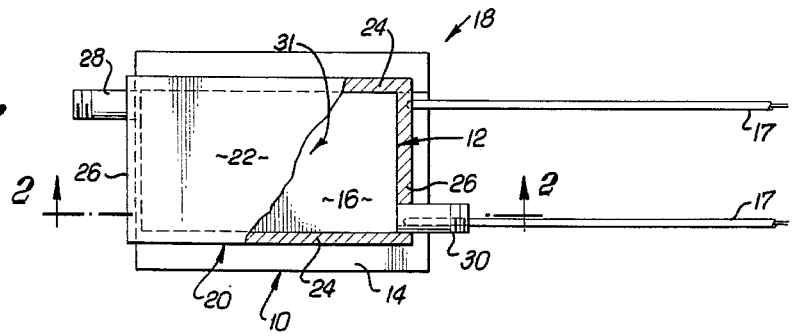
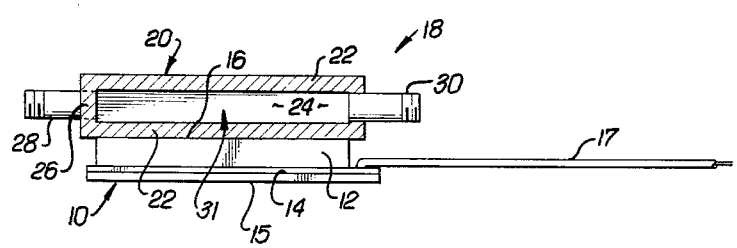
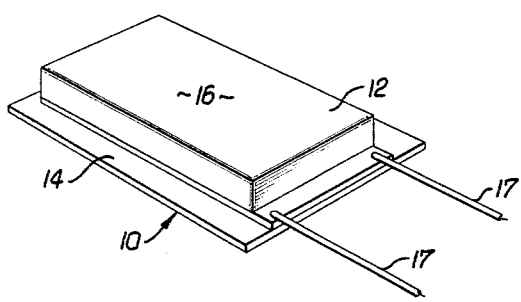
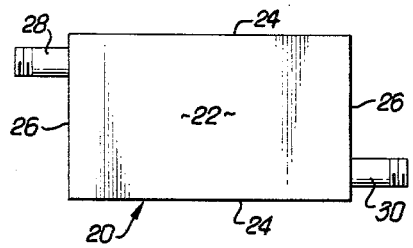
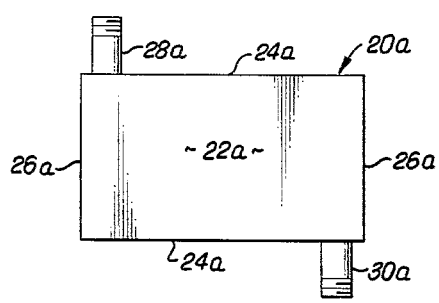
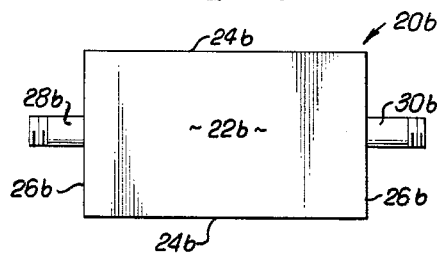
INVENTOR.
*ERNEST L. MORALES*
BY
*Huebner & Worrel*
ATTORNEYS.

INVENTOR.
ERNEST L. MORALES
BY Huebner & Worrel
ATTORNEYS

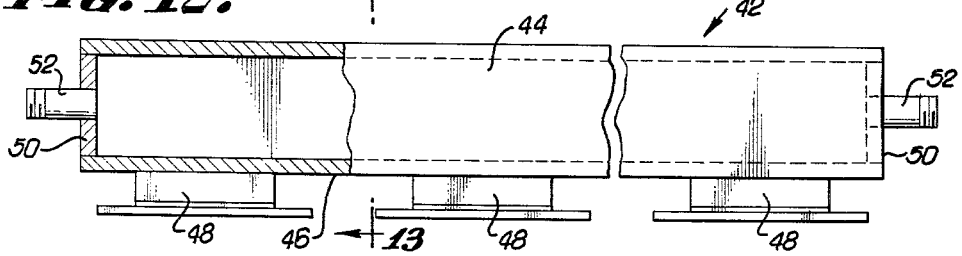
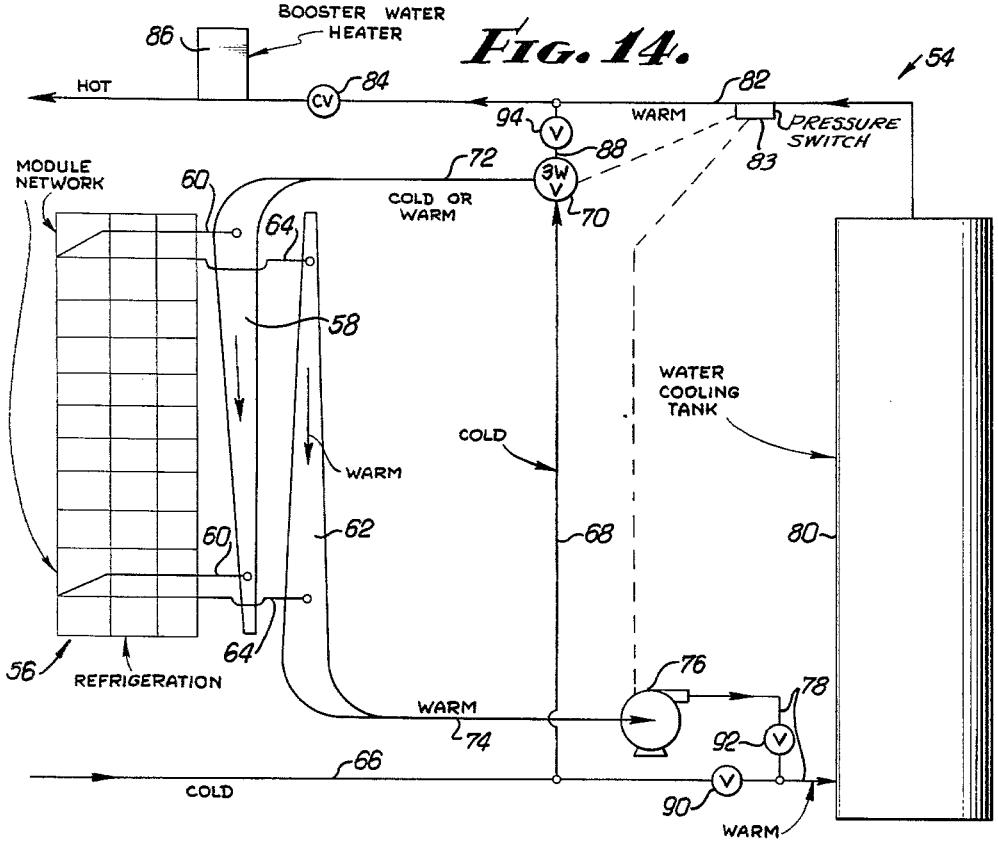
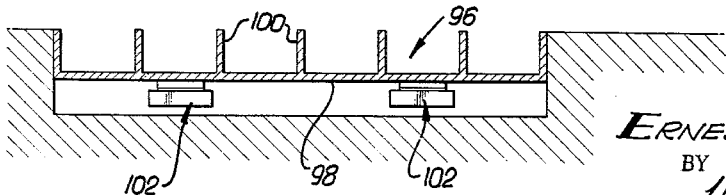

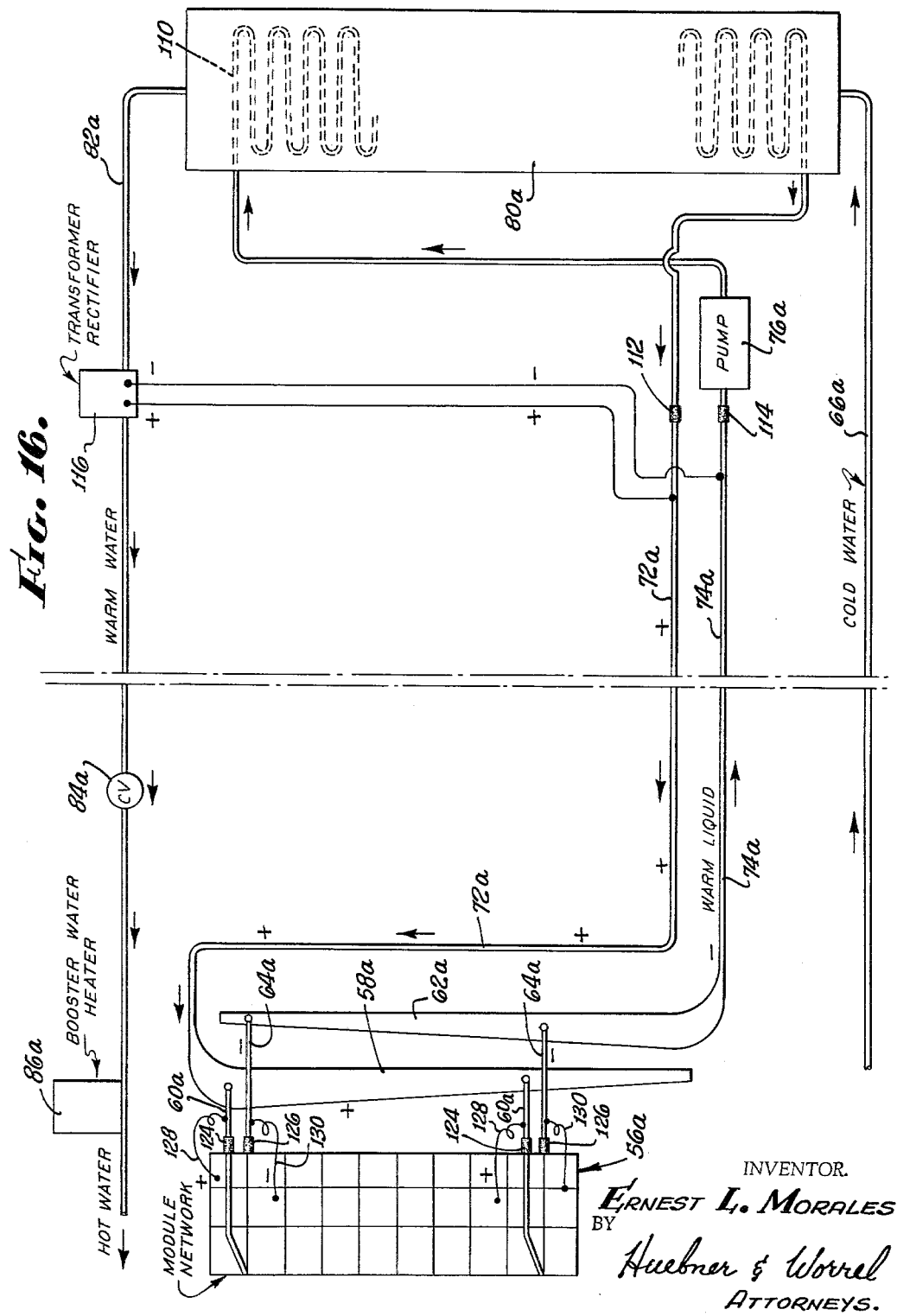

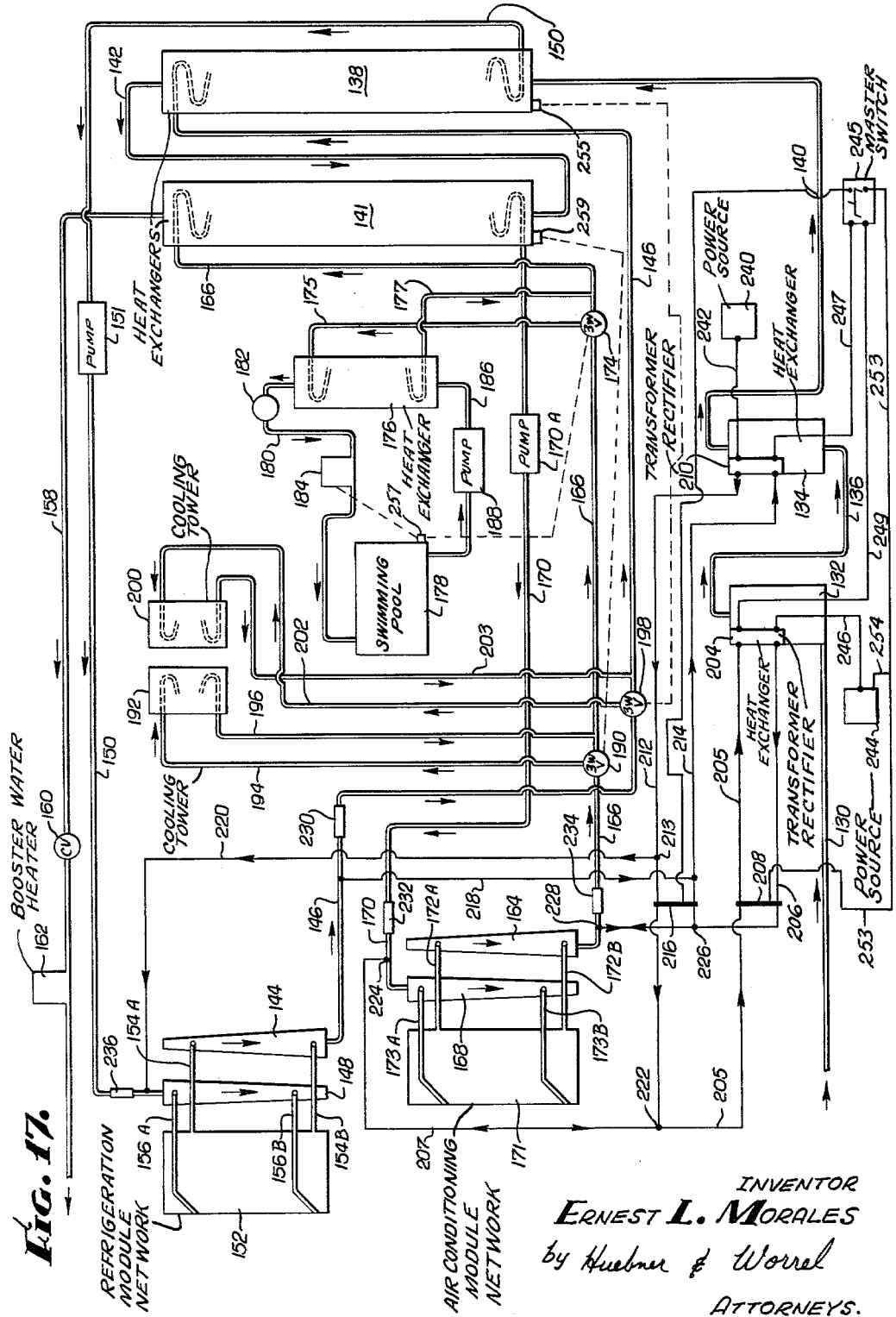

United States Patent Office 3,240,261
Patented Mar. 15, 1966

3,240,261
THERMOELECTRIC APPARATUS AND METHOD
Ernest L. Morales, Los Angeles, Calif., assignor of five percent to Robert H. Dietrich, North Hollywood, and twelve percent to Robert D. Paugh, fourteen percent to Loyl L. Peterson, fourteen percent to Edgar C. Watson, and five percent to Coyte D. Wilson, Los Angeles, Calif.
Filed Dec. 14, 1964, Ser. No. 419,285
16 Claims. (Cl. 165—2)

This application is a continuation-in-part of my copending application Serial No. 354,517, filed March 23, 1964, now abandoned, which is a continuation-in-part of my application Serial No. 242,136, filed December 4, 1962, for "Thermoelectric Apparatus," now abandoned.

The present invention relates to thermoelectric cooler modules, and it relates particularly to novel water jacket structures which are operatively associated with the hot sides of the thermoelectric cooler modules so as to provide thermo-cooler units through which water can be circulated so as to remove heat generated at the hot sides of the modules and thereby correspondingly decrease the temperature at the cold sides of the modules for increased refrigeration efficiency. The invention also relates to the utilization of these thermo-cooler units in systems and facilities wherein the heat which is transferred to the water or other liquid coolant passing through the thermo-cooler units is utilized either in place of or to supplement conventional heating means, whereby the overall efficiency of a temperature control system involving both refrigeration and heating is sufficiently high to be competitive with other systems and commercially useful.

Thermoelectric cooler modules utilize the "Peltier effect," which is that whenever an electric current flows in a circuit comprising dissimilar conductors, heat is absorbed at one junction and evolved at the other in a thermodynamically reversible process. Thus, thermoelectric cooler modules, when supplied with direct current, absorb heat and become cold at one side, and evolve heat and become hot at the other side, and these modules are therefore often referred to as "heat pumps." Such thermoelectric cooler modules have, until very recently, been very inefficient, and have required high current at very low voltage for operation. However, within the last several years, because of advances in semiconductor materials, thermoelectric cooler modules are now in commercial production which are relatively efficient, and which employ lower current and higher voltage. While there are a number of different modules currently available, an example of one relatively efficient one which I have found to be satisfactory for the purposes of the present invention is module model No. 433 (with or without mounting plate) produced by Jepson Thermoelectrics, Inc. Such units are very small and compact, having a wafer-like shape with the hot and cold sides as the flat sides of the wafer, so that the units are particularly adapted for lining refrigerator walls or other areas to be refrigerated.

Despite recent advances in thermoelectric cooler modules, they still only have marginal efficiency as compared with refrigeration systems of the compressor type. One reason is the relatively large amount of heat loss in the thermoelectric cooler modules, the combination of transfer of heat from the cold side to the hot side and the power loss in the module causing the hot side to increase in temperature more than the cold side decreases in temperature, all else being equal. Since the thermoelectric cooler modules establish a temperature differential between the cold and hot sides, the amount of refrigeration available at the cold side depends entirely upon how cool the hot side is kept, and heretofore it has been standard practice to dissipate the heat as much as possible on the hot sides of the modules by the use of cooling fins, fans and the like.

According to the present invention, thermoelectric cooler modules are made practical from an efficiency standpoint by the provision of novel means for cooling the modules which is associated with the hot sides thereof, wherein the heat that is removed is utilized in an overall system so that the power required in the system is within acceptable limits. In the present invention, water circulation structures, such as water-tight jackets, are attached in heat conducting relationship to the hot sides of the thermoelectric cooler modules, either singly or in banks, and a water circulation system is coupled with these module jackets or other circulation structures for transferring heat from the hot sides of the modules to the water and thereby cooling the hot sides of the units and correspondingly lowering the temperature of the cold sides; and the water in the system which is thus heated is utilized in an overall facility which requires both heating and refrigeration, thereby reducing the overall power required for temperature control involving both refrigeration and heat.

Facilities embodying the present invention have the additional advantage that the conduit means employed for conducting liquid coolant to and from the thermoelectric modules is adaptable for use as electrical conduit means for conducting the relatively high amperage operating current to the modules.

Detailed objects, advantages and applications of the invention will appear during the course of the following part of this specification, wherein the details of construction, mode of operation and method steps of preferred embodiments are described with reference to the accompanying drawings, in which:

FIGURE 1 is a plan view, with a portion broken away, illustrating one form of thermo-cooler unit in accordance with the present invention.

FIGURE 2 is a sectional view along the line 2—2 in FIGURE 1.

FIGURE 3 is a perspective view illustrating a thermoelectric module which may be employed in the present invention.

FIGURE 4 is a plan view of a water jacket of the type shown in FIGURES 1 and 2 which is adapted to be attached to a thermoelectric module to provide a thermo-cooler unit according to the present invention.

FIGURES 5, 6, 7 and 8 are plan views illustrating additional forms of water jackets which may be employed in the invention, FIGURE 8 having a portion broken away.

FIGURE 12 is a side elevation view, with a portion broken away, illustrating a "gang" type thermo-cooler unit wherein a plurality of thermoelectric modules are connected to a single water jacket.

Figure 7:
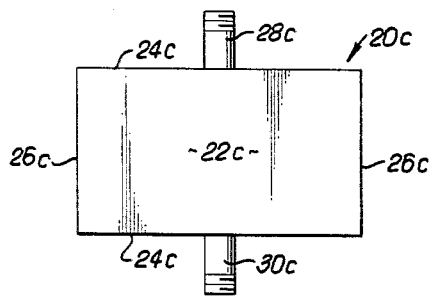

FIGURE 14 is a diagrammatic view illustrating a fully automatic system for use in connection with a facility requiring both refrigeration and heating, wherein the refrigeration is provided by a network of thermo-cooler units according to the present invention, with warm water from the thermo-cooler units being provided to a part of the facility utilizing warm or hot water, or being recirculated through the thermo-cooler units when warm or hot water is not required.

FIGURE 15 is a horizonal sectional view illustrating an air-conditioning panel employing thermo-cooler units according to the invention.

FIGURE 16 is a diagrammatic view generally similar to FIGURE 14, but illustrating a system utilizing a closed circuit for recirculation of the liquid coolant, and heat exchanger means for transferring heat from the coolant to water that is piped in for use, this system being particularly well adapted for use of the coolant conduit means as electrical conduit means for conducting the operating current to the modules.

FIGURE 17 is a diagrammatic view illustrating a system using multiple heat exchangers for transferring heat from the coolant to water that is piped in for use in the system.

Referring to the drawings, and at first particularly to FIGURES 1–3 thereof, a thermoelectric module 10 is illustrated, and includes a generally flat, rectangular body portion 12 having a mounting plate 14 forming one of the flat sides thereof and extending as a flange beyond the periphery of body portion 12. The generally flat side 15 of mounting plate 14 is normally the cold side of the module, while the generally flat top 16 of the body portion 12 is normally the hot side. A pair of D.C. lead-in wires 17 are connected to the module 10.

Thermoelectric modules which are shaped generally like the module 10 shown in the drawings are standard, commercially available items. However, thermoelectric modules useful in the present invention are provided in a variety of sizes and shapes, all of them having what may generally be referred to as a hot side and a cold side, and it is to be understood that the present invention may be employed in combination with a wide variety of such thermoelectric modules, and that the invention is not limited to the particular type shown. It is also to be understood that the mounting plate 14 is an optional feature, and that thermoelectric modules can be employed in the present invention either with or without the mounting plate.

FIGURES 1 and 2 show a thermo-cooler unit according to the present invention, which is a combination of one of the thermoelectric modules 10 and a water jacket 20 that is permanently secured to the module 10 in covering relationship over the hot side 16 of the module 10. The water jacket 20 which is shown in FIGURES 1 and 2, and also in FIGURE 4, comprises a generally rectangular unit having rectangular top and bottom walls 22, side walls 24 and end walls 26, with an inlet pipe or plumbing fitting 28 connected to one of the end walls 26 so as to communicate with the inside of the jacket 20, and an outlet fitting 30 connected to the other end wall 26 so as to communicate with the inside of the jacket 20. The jacket 20 may be composed of any suitable material, such as a metal like aluminum, brass or other suitable metal, or a suitable plastic. In the thermo-cooler unit 18 shown in FIGURES 1 and 2 the water jacket 20 is attached to the body portion 12 of module 10 with the bottom wall 22 of the jacket in face-to-face contact with the flat hot side 16 of module 10. The jacket 20 is connected to module 10 by any suitable means, such as by bonding with an aluminum impregnated epoxy resin. Because of the flat surface-to-surface contact between the bottom wall 22 of the jacket and the hot side of the module, there is excellent heat conductivity between the hot side of the module and the water circulating through the jacket, whereby the hot side of the module will be cooled and the water will be heated.

FIGURE 4 is a top plan view showing the water jacket 20 which is combined with the thermoelectric module 10 in FIGURES 1 and 2. It will be noted that the inlet and outlet fittings 28 and 30 are at opposite sides of the end walls 26. This offset relationship between the inlet and outlet fittings 28 and 30 causes a turbulence in the flow of water within the chamber 31 inside of the jacket, which provides more efficient heat transfer from the hot side of the module 10 to the water than would be the case for aligned fittings.

FIGURE 5 illustrates an alternative jacket 20a having top and bottom walls 22a, side walls 24a and end walls 26a, wherein the inlet and outlet fittings 28a and 30a, respectively, are connected to the side walls 24a instead of to the end walls, and are offset at opposite ends of the side walls 24a.

FIGURE 6 illustrates a jacket 20b having top and bottom walls 22b, side walls 24b and end walls 26b, wherein the fittings 28b and 30b are centrally located on the end walls 26b. This will reduce the turbulence in the jacket, in case it is desired to reduce the amount of power consumed by pumping apparatus employed for circulating water through a number of the thermo-cooler units.

FIGURE 7 shows a further alternative jacket 20c having top and bottom walls 22c, side walls 24c and end walls 26c, wherein the fittings 28c and 30c are centrally located on the side walls 24c.

Figure 8:
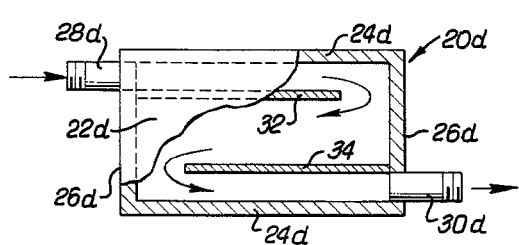

FIGURE 8 illustrates a jacket 20d which is similar externally to the jacket 20, having similar top and bottom walls 22d, side walls 24d and end walls 26d, and having similarly located inlet and outlet fittings 28d and 30d, respectively. However, the jacket 20d shown in FIGURE 8 differs from the jacket 20 in that internal baffle plates or ribs 32 and 34, which are parallel to the side walls 24 and 26, force the circulating water to follow a tortuous path through the jacket 20d for improved heat transfer from the hot side of the thermoelectric module to the water flowing through the jacket.

Although the jackets shown in FIGURES 1, 2 and 4–8, have a rectangular shape generally commensurate with the shape of the body portion 12 of module 10, it is to be understood that if it is desired, the jacket may be made in a rectangular shape considerably larger than the module, so as to allow the heat from the hot side of the module to be conducted to a larger bottom wall area of the jacket, for better heat conduction to the water in the jacket.

Figure 9:
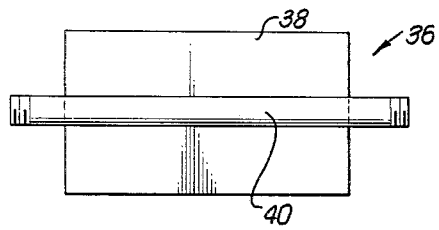
FIGURES 9, 10 and 11 illustrate three further forms of water circulation structures adapted to be attached to thermoelectric modules to provide thermo-cooler units according to the present invention.

A still further type of module cooling structure 36 is illustrated in FIGURE 9, and comprises a generally flat, rectangular plate 38 of a material which is highly conductive of heat, such as aluminum, with a tube 40 of similar material welded or otherwise intimately secured to one side of the plate 38, the tube 40 extending along the longitudinal center of plate 38 and having the ends threaded or otherwise formed as fittings. The other side of plate 38 is bonded to the flat hot side 16 of the thermoelectric module 10.

Figure 10:
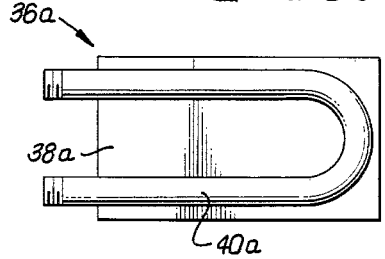

FIGURE 10 illustrates a module cooling structure 36a which is similar to structure 36 in that it includes a flat plate 38a, but wherein the tube 40a is arranged in a U shape so as to provide a considerably greater length of the tube which is in contact with the plate 38a. In the structure shown in FIGURE 10, the fittings are both at the same edge of the plate, which is an end edge of the plate. If desired, a shorter U shaped tube could be applied to the plate so that the ends of the tube are at one of the side edges of the plate rather than an end edge of the plate.

Figure 11:
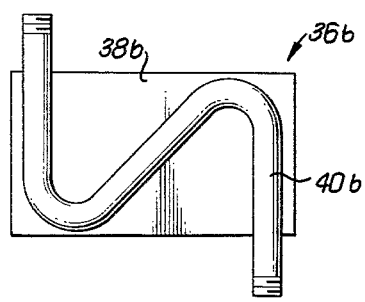
Figure 13:
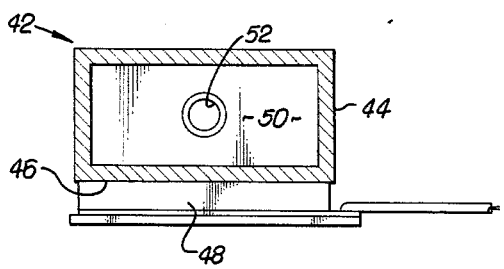
FIGURE 13 is a sectional view along the line 13—13 in FIGURE 12.

FIGURE 11 shows a further module cooling structure 36b which likewise utilizes a flat plate 38b, but wherein the tube 40b is arranged generally in an S shape, with one fitting extending from one of the side edges of the plate and the other fitting extending from the other side edge of the plate.

FIGURE 12 illustrates a "gang" type of thermo-cooler unit 42 comprising a single water jacket 44 having a flat surface 46 to which a plurality of thermoelectric cooler modules 48 are attached at their hot sides. The water jacket structure 44 may be made from conduit having a rectangular cross-section, such as an aluminum extrusion in this shape, with end closures 50 having fittings 52 connected thereto.

This "gang" type of thermo-cooler unit decreases resistance to the flow of water, thus reducing pump power requirements, and if an adequate cross-section of the water jacket conduit is provided, the water temperature will not be raised at the downstream end of the jacket sufficiently to interfere with proper cooling of the modules toward the downstream end.

Although the thermo-cooler units in accordance with the present invention may be employed in a wide variety of water circulation systems, FIGURE 14 illustrates a novel automatic system for a kitchen or other facility wherein both refrigeration and hot water are required. The system shown in FIGURE 14 is generally designated by the reference numeral 54, and includes a bank or network 56 of thermo-cooler units which may be utilized to refrigerate a refrigerator cabinet, freezer, refrigeration room or the like. The cooling water is supplied to the network 56 from a water inlet header or manifold 58 through conduits 60. This water will be heated when it passes through the water jackets or other module cooling structures of the thermo-cooler units in the network 56, and this warm water is fed to a water outlet header or manifold 62 through conduits 64.

Cold water is supplied to the system from the street main through cold water line 66, and communicates through a branch line 68 to a three-way pressure-actuated valve 70. When warm or hot water is being withdrawn from the system 54 to be utilized in the facility, reduced line pressure causes the three-way valve 70 to be positioned so as to connect the branch line 68 with an inlet line 72 which is connected to inlet header or manifold 58, whereby cold water will circulate through the network 56 and become heated, and then will pass into the outlet header or manifold 62. This warm water, which may be referred to as pre-heated water, then passes through warm water line 74 to a continuously operating water pump 76 which pumps the preheated water through a conduit 78 into a tank 80. Warm water from tank 80 is withdrawn through warm water outlet conduit 82 and passed through check valve 84, for use in the facility. A booster water heater 86 is preferably provided in the warm water outlet conduit 82 so as to boost the preheated water from tank 80 to the desired temperature, the booster water heater 86 being thermostatically controlled and only operating when required.

The valve 70 is preferably electrically actuated, in response to actuation of a pressure switch 83 or the like which communicates with the warm water outlet conduit 82 so as to be responsive to pressure changes in conduit 82.

When warm or hot water is not being withdrawn from the system out of conduit 82, the increased pressure in conduit 82 will actuate the automatic three-way valve 70 so as to block off the branch cold water line 68 and to connect the warm water outlet conduit 82 with the inlet line 72 through a connecting conduit 88, and in this operative condition of the system, water will be circulated by pump 76 through a closed circuit comprising inlet header or manifold 58, conduits 60, network 56, conduits 64, outlet header or manifold 62, warm water line 74, pump 76, conduit 78, tank 80, warm water outlet conduit 82, and then through connecting conduit 88 and back to valve 70 and to the inlet line 72.

This closed circuit path is relatively free-flowing, and therefore requires only low speed operation of the pump 76, with very little driving power being furnished to pump 76. Accordingly, the pump 76 is operatively connected to the pressure switch 83 which controls the three-way valve 70 so that when the valve 70 is in the recirculating position (blocking off line 68 and connecting conduit 82 with line 72 through conduit 88), the pump 76 operates at low speed; but in the other position of valve 70, when warm or hot water is being withdrawn from the system (valve 70 connecting line 68 with line 72 and blocking off conduit 88), the pump operates at a relatively high speed.

In the recirculating condition of the system, the tank 80 will serve as a combined warm water storage tank and cooling tank, continuously radiating sufficient heat so that the water that is recirculated through the network 56 will be cool enough to adequately cool the individual thermo-cooler units in the network 56.

As soon as a hot water faucet is opened to withdraw water from the warm water outlet conduit 82, the pressure drop in the conduit 82 will again cause the valve 70 to shift back to the position first described, wherein the cold water branch line 68 is connected through valve 70 to the inlet line 72, and in this position of the valve 70, the connecting conduit 88 is blocked so that full hydraulic pressure from the street main is applied to the system. In this condition of operation of the system 54, the path of travel of the water is from the street main through cold water line 66, branch line 68, valve 70, inlet line 72, header or manifold 58, conduits 60, network 56, conduits 64, header or manifold 62, warm water line 74, pump 76, conduit 78, and cooling tank 80, from which the preheated water passes through warm water outlet conduit 82 and check valve 84, and thence past the booster water heater 86 and out of the system. In this condition of the system the pump 76 will be operating at its relatively high speed.

Three shut-off valves 90, 92 and 94 are employed in the system 54 so that the automatic control valve 70, headers 58 and 62, and the module network 56 can be by-passed for repairs. These include a normally closed valve 90, which, when opened for repairs, will provide direct communication between the cold water line 66 and the warm water conduit 78. A second valve 92 is positioned in the outlet conduit 78 from pump 76, and is normally open, but is moved to a closed position for repairs, thus blocking off the water circuit from the pump 76. The third valve 94 is disposed in the connecting conduit 88, and is normally open, but is closed for repairs so as to block off communication between the warm water outlet conduit 82 and the automatic valve 70.

It is to be understood that while the automatic flow control system 54 shown in FIGURE 14 has particular utility in connection with the thermo-cooler units of the present invention, a wide variety of flow control systems embodying the thermo-cooler units of the present invention can be employed with useful results. A system such as that shown in FIGURE 14 is highly useful in a restaurant facility, where a considerable amount of refrigeration is required, and also a relatively large amount of hot water is required for washing dishes, brewing coffee and other uses. Accordingly, a network of the thermo-cooler units can be employed for the restaurant refrigeration, while at the same time water is pre-heated and furnished to the water heater and to the coffee making equipment.

It is preferred in a system like that of FIGURE 14 to employ a water softening device in the cold water line 66 to prevent lime deposits from accumulating in the small fluid passages of the module network. Any suitable conventional water softening apparatus may be used for this purpose.

In general, the present invention has particular utility in places where considerable refrigeration and hot water are both required, as in restaurants, bars, meat packing houses, or the like.

Once the overall efficiency of the refrigeration-hot water system is utilized according to the present invention, so that the operating cost of refrigeration by use of a network of thermoelectric cooler modules is within acceptable limits, a number of additional advantages are appreciated in this type of refrigeration system. This system permits elimination of the usual compressor and cooling coils, which increases the storage capacity for a refrigeration unit on the order of about 20% without increase in the overall size, and which eliminates the noise and vibration of the compressor, and also eliminates servicing problems associated with compressors.

The thermo-cooler units are usually distributed in a network in contact with the outside surface of inner metallic lining means for a refrigeration compartment. For example, the units can be employed in a walk-in refrigerator room by providing several dozen or more of the units on top of an aluminum sheet which will form the ceiling for the walk-in refrigerator.

A system similar to that shown in FIGURE 14 is ideal for use in connection with home refrigerators and freezers, with the pre-heated hot water being supplied to the ordinary hot water heater for the home, and this will provide a substantial saving in the amount of gas or electricity employed in the hot water heater.

Another use of the present invention is in connection with steam-heated buildings wherein refrigeration is required. The pre-heated water from the thermo-cooler units of the refrigeration area is fed to the intake line of the boiler for providing the steam to heat the building. The condensed steam is routed through the module network, and at that time is in the form of tepid water, the module network pre-heating the water to a temperature somewhat below the boiling point.

The heated water from the thermo-cooler units of refrigeration area in a building could also be provided through piping in floor areas for radiant heating during cold weather; and in warm weather, a thermostatically controlled by-pass valve would by-pass the heated water to a cooling tank or cooling tower or the like for return to the thermo-cooler units.

The use of thermo-cooler units in a system such as that shown in FIGURE 14 has a unique advantage in that it provides automatic defrosting where it is employed in connection with a refrigerator compartment. Water, either cold or warm, is continuously flowing through the water jackets of the thermo-cooler units, regardless of whether or not electrical power is supplied to the units. Thus, when the air and other contents in the refrigerator reach the desired low temperature by operation of the thermo-cooler units, the thermostat in the refrigerator turns off the electrical power to the units. However, the water, either cold or warm, continues circulating through the jackets of the units and will in a very short time increase the temperature of the cold sides of the modules to above the freezing point, this temperature being diffused along the inside metallic lining of the refrigerator and quickly melting any thin film of frost which may have formed on the lining. This frost is melted so quickly that it disappears before the temperature of the air and contents in the refrigerator increase sufficiently to trigger the thermostat for again applying the power and resuming the refrigeration operation, and thus "hunting" will not occur. The prevention of an accumulation of ice by this automatic defrosting increases the efficiency of refrigeration, as ice will act as an insulator against refrigeration.

Such automatic defrosting is much more efficient than defrosting in compressor systems, as defrosting in a compressor type refrigerator is usually dependent upon the temperature of the air and contents of the refrigerator rising above the freezing point, which in many installations would be undesirable. With the present system, the temperature of the air and contents in the refrigerator can be kept below the freezing point, while defrosting will still automatically occur. The only way by which defrosting is currently effected in compressor type refrigerators without raising the temperature of the air and contents above the freezing point is to entwine an electrical heating element with the refrigeration tubing, which increases the cost of the equipment and of the operation thereof.

It will be apparent that systems of this type are well adapted for use in connection with refrigerated trucks, trailers, railroad cars, ships and other mobile units. In the case of trucks, trailers and railroad cars, the present invention wil be provided so that the water circulates in a closed circuit. Cooling of the heated water in the system can be accomplished by circulating the water through a cooling grid or conduit means having cooling fins disposed beneath the chassis of the vehicle unit. A closed circuit system may be employed in a facility requiring both refrigeration and hot water with generally the same benefits as the systems of FIGURE 14 as well as other benefits. Such a closed circuit system is shown in FIGURE 16 and described in detail hereinafter.

FIGURE 15 of the drawings illustrates an adaptation of the present invention for air conditioning of buildings, homes or the like, wherein an air conditioning panel 96 is disposed at a strategic location in the room to be air conditioned, as in a wall recess, the panel 96 including a generally flat back 98 having integral, vertically arranged fins 100 directed toward the room. The panel 96 is preferably but not necessarily an aluminum extrusion. A number of thermo-cooler units 102 according to the present invention are attached to the back of the panel 96.

During the summer, the polarity of the direct current supplied to the thermo-cooler units 102 is such that the panel 96 will be refrigerated, causing frost to form thereon. Preferably, a drip pan is provided at the floor underneath the panel 96 to catch the water resulting from melting of this frost. The water which is circulated through the thermo-cooler units 102 is supplied to the water heater or is otherwise employed in the hot water system of the building. The frost which forms on the panel 96 is excellent psychologically during hot summer days because of its appearance of coolness, and it also has the advantage of reducing the humidity as the water vapor is condensed, which is an important factor for hot weather comfort. Furthermore, with this system, there are no drafts created.

During the winter months, the polarity of the direct current supplied to the units 102 is reversed, whereby the panel 96 will become a heat radiator. This creates cold water in the water jackets of the thermo-cooler units 102, and this cold water can be utilized by being fed to a separate refrigeration network of the thermo-cooler units (this is, for example, associated with a refrigerator cabinet, cold storage room or the like), and this circulated cold water will not only cool the hot sides of the thermo-cooler units in this separate refrigeration network, but will also result in such a substantial cooling of the cold sides thereof that considerably less current will be required in the refrigeration system, whereby overall efficiency is greatly improved. Also, the cold water from the jackets of the thermo-cooler units 102 could be used for drinking fountains to eliminate the refrigeration thereof, or if there is a surplus of this cold water, it could merely be warmed in some hot area of the building, as in an elevator engine room or other such area, for recirculation to the units 102.

Air conditioning could also be provided, with similar summer and winter adaptations, by utilizing a blower for circulation of the cold air in the summer or the warm air in the winter, in place of employing a heat absorbing or radiating wall air conditioning panel such as the panel 96.

The present invention also has particular utility in connection with private homes of the type employing all electrical utilities, including refrigerator, freezer, air conditioner, stove, water heater and the like, and in this case a variation in the water circuit between summer and winter months similar to that described above in connection with the air conditioning panel is desirable. Thus, in the summer, warm or hot water from thermo-cooler units employed both in air conditioning and refrigeration is supplied to the hot water heater. However, in winter the direct current polarity to the thermo-cooler units of the air conditioner is reversed, so that the air conditioner becomes a heating device, and the cold water from the thermo-cooler units of the air conditioner-heater is then piped through the thermo-cooler units of the refrigeration device or devices, and thence to the water heater.

Referring now particularly to FIGURE 16, the system that is diagrammatically shown therein is adapted for generally the same use as the system shown in FIGURE 14, but is simpler in construction and has certain definite advantages over the system of FIGURE 14. Thus, the apparatus of FIGURE 16 embodies a closed circuit for recirculation of the liquid coolant for the thermo-cooler units, and a heat exchanger is employed to transfer heat from the liquid coolant to water that is piped in, with the liquid coolant and the incoming water being kept separate. This eliminates most of the valving required in the arrangement of FIGURE 14, thus simplifying the structure and operation of the apparatus. Additionally, the apparatus of FIGURE 16 is thereby rendered particularly suitable for cooperation of the liquid coolant conduit means in the electrical power circuit for the thermo-cooler units.

The system shown in FIGURE 16 includes a bank or network 56a of thermo-cooler units which may be utilized to refrigerate a refrigerator cabinet, freezer, refrigeration room or the like. The liquid coolant is supplied to the network 56a from a liquid inlet header or manifold 58a through conduits 60a. The liquid coolant will be heated when it passes through the water jackets or other module cooling structures of the thermo-cooler units in the network 56a, and this warm liquid is fed to a liquid outlet header or manifold 62a through conduits 64a.

The warm liquid coolant passes from outlet header or manifold 62a through warm fluid line 74a to a continuously operating fluid pump 76a which pumps the heated liquid through a conduit 78a into a heat exchanger tank 80a. The liquid from conduit 78a passes through suitable heat exchange means in the tank 80a, such as coil 110, and thence out of tank 80a and through return line 72a to the liquid inlet header or manifold 58a and thence back through the module cooling structures of the thermo-cooler units in network 56a.

This closed fluid circuit for recirculating the liquid coolant can be at relatively low pressure and requires only a relatively small pump capable of continuously driving the coolant fluid through the circuit at a fixed speed.

Cold water enters the system from the street main through cold water line 66a, and passes into the heat exchanger tank 80a wherein it is heated by conduction of heat from the liquid coolant. Accordingly, warm or preheated water will be stored in the heat exchanger tank 80a. Warm water from tank 80a is withdrawn through warm water outlet conduit 82a and passed through check valve 84a for use in the facility. A booster water heater 86a is preferably provided in the warm water outlet conduit 82a so as to boost the pre-heated water from tank 80a to the desired temperature, the booster heater 86a being thermostatically controlled and only operating when required.

The heat exchanger tank 80a is actually more than a mere heat exchanger, serving several additional important functions in the system. For one thing, the tank 80a acts as a heat sink, heat transferred to the initially cold water therein gradually building up the temperature within the tank. Thus, when hot water is withdrawn from outlet conduit 82a, the heat therein will represent a build-up which has accumulated over a period of operation of the thermoelectric module network 56a. Additionally, the tank 80a will function as a cooling tank when insufficient hot water is withdrawn from outlet conduit 82a, excess heat generated in the module network 56a being radiated from tank 80a. In this manner the liquid coolant that is recirculated through the network 56a will be cool enough to adequately cool the individual thermo-cooler units in the network.

One important advantage of the recirculating type system shown in FIGURE 16 is that it is particularly adaptable for use of the liquid coolant conduit system as electrical conduit means for conducting the necessary electrical operating current to the modules in the network 56a. This can be of great importance where the system is employed in a place, such as a relatively large office building or hotel building, where there are heavy requirements for refrigeration and air conditioning, and also for hot water, and where the conduits (72a and 74a) for the liquid coolant are likely to be extensive in length.

Provision of the required high amperage, low voltage current to the thermoelectric module network 56a is normally a difficult problem, since it requires heavy duty electrical cable to handle the high amperage without too much electrical resistance loss and without too great a danger of overheating of the electrical conductors, and hence of fire. The use of the recirculating coolant conduit system of FIGURE 16 in the electrical power circuit provides unique cooperation for several reasons. For one thing, the liquid conduits of necessity have relatively large cross-sectional and surface areas and can be made of good electrical conducting metal, such as aluminum or copper. Thus, the recirculating coolant conduits make excellent electrical conductors. Another reason is that the liquid coolant is completely isolated from the water pipes connected to the street main, i.e., water line 66a, tank 80a and hot water outlet line 82a. Because of this, a liquid coolant may be selected which is substantially a non-conductor of electricity. The use of a non-conducting liquid is a requirement where the coolant conduits are employed in the electrical system. A presently preferred liquid coolant employed in the recirculating cooling system is distilled water, although it will be understood that other suitable electrically non-conducting liquid coolants may be employed within the scope of the invention.

Use of the recirculating cooling fluid conduits as electrical conductors in the present system has the unique advantage of conserving or utilizing any heat produced by electrical resistance losses in the travel of the electricity through the conduits, since such heat generated in the metal of the conduits is transferred to the liquid passing through the conduits, and hence transferred to the heat exchanger tank 80a. This transfer of electrical resistance heat from the conduits to the liquid therein has the further advantage of minimizing or eliminating fire hazards normally associated with high amperage electrical circuits.

It is to be understood that the portions of the liquid coolant conduit system which are employed as electrical conductors must be electrically insulated from any nearby electrically conducting structures. Thus, the conduit 72a is electrically isolated from the heat exchanger tank 80a by a length of electrically insulated tubing 112 in conduit 72a near the tank 80a. This tubing 112 may be composed of any suitable non-conductor, such as hard rubber, Nylon, Teflon, porcelain, ceramic, or other insulating material, provided the material is capable of withstanding the heat, pressure and forces required for physical connection in the system. A similar length of electrically non-conducting tubing 114 is placed in the conduit 74a so as to isolate the main part of conduit 74a from both the pump 76a and the heat exchanger tank 80a. It will be seen that the non-conducting tube portions 112 and 114 will effectively isolate the conduits 72a and 74a from the water pipe system including conduit 66a, heat exchanger tank 80a and the hot water outlet conduit 82a.

D.C. current of relatively high amperage and low voltage is provided by any suitable means, such as by means of a transformer-rectifier unit 116 having outlet conductors 118 and 120. Conductor 118 is designated positive and 120 designated negative for reference purposes. The transformer-rectifier output conductor 118 is electrically connected to the fluid line 72a, while the conductor 120 is electrically connected to the fluid line 74a, these connections being at the sides of the insulated tubing members 112 and 114 remote from the heat exchanger tank 80a. Where the refrigeration or air conditioning and hot water requirements are heavy, as in a large building, it will normally be preferable to have a transformer-rectifier unit 116 of the type that is liquid cooled, and if this is the case it is desirable to employ heat exchange means in the unit 116 and to have this connected in the warm water outlet conduit 82a so as to impart the heat generated in unit 116 to the warm water in conduit 82a and thereby increase the overall efficiency of the system.

In order to make maximum usage of the recirculating cooling fluid conduit system for electrical conduction, it is desirable to utilize the liquid conduits for electrical conduction to positions as far as possible from the individual modules. Thus, the positive electrical conductor side of the electrical system may include the transformer-rectifier output conductor 118, the fluid return conduit 72a, the inlet header or manifold 58a, and the conduits 60a which provide coolant liquid from the header or manifold 58a to the module network 56a. On the other hand, the negative side of the electrical system may include the transformer-rectifier output conductor 120, the warm liquid line 74a, the header or manifold 62a and the liquid conduits 64a from the header or manifold 62a to the network 56a. It is to be understood that the stated polarities are for reference purposes only, and may be reversed.

It will be understood that the conduits 60a from the inlet header or manifold 58a will conduct liquid to the inlet pipes or fittings for the individual thermoelectric modules, which for the module 10 shown in FIGURES 1 to 4 of the drawings would be the inlet fitting 28. Similarly, the conduits 64a from the outlet header or manifold 62a would communicate with the outlet fitting 30 of the module 10 shown in FIGURES 1 to 4, and this may be effectively accomplished by merely utilizing electrically non-conducting inlet and outlet fittings 28 and 30 for each of the individual modules such as the module 10. The D.C. lead-in wires 17 shown in FIGURE 3 may then be electrically connected to the inlet and outlet pipes which are attached to the respective fittings 28 and 30.

In order to most simply illustrate the system, I have shown non-conducting fittings 124 for the liquid input to the module network 56a from the liquid inlet conduits 60a. Similarly, I have shown electrically non-conducting fittings 126 for the liquid outlet from network 56a to the outlet conduits 64a. These non-conducting fittings 124 and 126 may be considered as fittings for the individual modules, such as fittings 28 and 30, or they may actually be fittings which cover the flow of liquid to groups of modules. If desired, short non-conducting pipe or tube sections may be employed instead of the non-conducting fittings just described. In any event, the modules themselves will be electrically isolated from the electrically "hot" parts of the liquid conduit system, except for the lead-in wires for delivering operating current to the modules.

I have shown lead-in wires 128 from the conduits 60a to the network 56a as part of the positive side of the electrical system, and lead-in wires 130 from the conduits 64a to the network 56a as part of the negative side of the electrical system. The conductors 128 are connected to one of the D.C. lead-in wires 17 as shown in FIGURE 3 of each module, and the conductors 130 are connected to the other lead-in wire 17 of each module.

The electrically "hot" portions of the recirculating system, including the conduits 72a and 74a, the headers or manifolds 58a and 62a, and the conduits 60a and 64a, are all suitably electrically insulated on the outsides thereof, as by being supported on insulated brackets or suspension members, or by being covered with a suitable insulation material. One particularly desirable way of insulating these conduits is to cover them with asbestos or other rock fiber material which is both a good electrical insulator and a good heat insulator. The heat insulating properties of such a material would help to conserve any electrical power loss in the system as a heat gain for transfer of this heat to the incoming water in the heat exchanger tank. Normally the relatively small increase in temperature of the liquid coolant by this means would not be enough to adversely affect the efficiency of the thermoelectric modules.

If aluminum conduits are employed in the closed circuit coolant system, it may be desirable to anodize the inside walls of such aluminum conduit portions of the system in order to prevent corrosion. This would also apply to the inside walls of the thermo-cooler modules. If desired, a suitable non-metallic coating may be applied to the inside walls of the conduits for the recirculating liquid coolant system, such as a thin plastic coating, in order to prevent the electrically non-conducting coolant liquid, such as distilled water, from becoming conductive by dissolving metal from the inside surfaces of the conduits.

Another novel automatic system using the thermo-cooler units in accordance with this invention is illustrated in FIGURE 17. The system shown in FIGURE 17 is adapted for use generally the same as FIGURE 16, but includes mutiple networks of thermo-cooler units which may be the double units 152 and 171 shown therein. In this system, for instance, one of the thermo-cooler units 171 can be an air-conditioner network and the other thermo-cooler unit 152 can be a refrigerator network. Heated fluid from these thermo-coolers is transmitted via conduits and appropriate heat exchangers so that a fluid reservoir such as the swimming pool 178 can be heated by the excess thermal-energy from the thermo-cooler units. Since, at different seasons of the year and times of the day the requirement for air-conditioning, etc., will vary, the system can be reversed so that the heat reservoir, such as the swimming pool 178 receives a greater proportion of thermal energy. If enough of the thermo-cooler units are in operation in the system the excess heat developed which is transmitted to such a swimming pool 178 can be enough to maintain the desired heat without any supplementing heating means. The particular amount of heat delivered to a swimming pool in such a system is controlled by optionally selectable thermostatic means, associated by-pass valving and actuating circuitry. Also, external fluid such as city water can be circulated adjacent the heated fluid in heat exchangers associated with the thermo-coolers so that it too can be heated and used as desired.

Since this system will operate using thermal energy which is normally wasted it can be operated, under the proper conditions, without any substantial increase in expense over that required for normal operation of the module networks.

In this system shown in FIGURE 17 the inlet pipe 130 communicates with a first heat exchanger 132 so as to provide a means for an external fluid such as city water for example to enter the system. Heat exchanger 132 communicates with a second heat exchanger 134 via heat exchanger connector pipe conduit 136. This heat exchanger 134, in turn, communicates with a third heat exchanger called herein refrigerator heat exchanger 138 via pipe conduit 140. Hence, fluids passing through these heat exchangers can heat the city water that enters the system.

Refrigerator heat exchanger 138 communicates with a fourth heat exchanger called herein air conditioner heat exchanger 141 via heat exchanger conduit 142. Also, communicating with heat exchanger 138 is outlet refrigerator manifold 144 via outlet refrigeration conduit 146. Refrigerator heat exchanger 138 also communicates with inlet refrigerator manifold 148 through outlet refrigerator conduit 150 having pump 151. Refrigeration module network 152 communicates with outlet refrigerator manifold 144 through conduits 154A and 154B and with inlet refrigerator manifold 148 through conduits 156A and 156B thereby completing this portion of the system.

Air conditioning heat exchanger 141 communicates with outlet line 158 so as to provide a means for release of warm water from the system. In this outlet line 158 is a check valve 160 for controlling the flow of water therein and booster heater 162 for raising the temperature of the water. Air conditioning heat exchanger 141 also communicates with outlet air conditioning manifold 164 via outlet air conditioning conduit 166 and with inlet air conditioning manifold 168 via inlet air conditioning conduit 170 which contains pump 170A. Air conditioning module network 171 communicates with manifold 164 through lines 172A and 172B and with manifold 168 through lines 173A and 173B.

Valve 174 is positioned within air conditioning conduit 166 which can communicate with swimming pool heat exchanger 176 by means of line 175. Swimming pool heat exchanger 176, in turn, can communicate by means of a separate recirculating fluid system with swimming pool 178 via line 180 which has a check valve 182 and a swimming pool booster heater 184. Swimming pool 178 communicates so as to complete the circuit with swimming pool heat exchanger 176 through line 186 which has a pump 188. The swimming pool heat exchanger 176 is connected so as to communicate in a system separated from the swimming pool 178 through line 177 with air conditioning conduit 166 between valve 174 and air conditioning heat exchanger 141.

Within air conditioning conduit 166 is valve 190 which is positioned between valve 174 and manifold 164. This permits communication with air conditioning cooling tower 192 via line 194. The cooling tower 192 is connected so as to communicate with air conditioning conduit 166 between valve 190 and valve 174 via line 196.

Within refrigeration conduit 146 is valve 198 which can allow communication with refrigeration cooling tower 200 via line 202. Refrigeration cooling tower 200 also communicates with conduit 146 between valve 198 and refrigerator heat exchanger 138 via line 203.

Associated with heat exchanger 132 is transformer (and rectifier) 204. Connected to this transformer (and rectifier) 204 are electric cables 205 and 206 which are in turn connected to switch 208. Associated with heat exchanger 134 is transformer and rectifier 210. Connected to this transformer (and rectifier) 210 are electric cables 212 and 214 which are in turn connected to switch 216. Between switch 216 and transformer 210 cable 214 is connected with outlet refrigeration conduit 146 via cable 218. Between switch 216 and transformer 210 cable 212 is connected with inlet refrigerator conduit 150 via cable 220.

After cable 212 passes through switch 216 it joins cable 205 at 222 which thereafter is connected to air conditioning inlet conduit 170 at 224. In a like manner after cable 214 has passed through switch 216 it joins cable 206 at 226 which thereafter is connected to outlet air conditioning conduit 166 at 228.

These various conduits are made of electrically conductive material such as copper or aluminum so that they can conduct electricity from and to the various cables that are connected to them. Non-conductor coupling units 230, 232, 234, and 236 are positioned on conduits 146, 170, 166 and 150, respectively, so that electricity flowing through correspondingly connected cables 218, 207, 206, and 220 will not flow down the conduits beyond these non-conductor units.

Electrical power from source 240 is transmitted to transformer 210 via cable 242 and power from source 244 is transmitted to the transformer 204 via cable 246. A master switch 245 is connected to transformer 210 via cable 247 and to transformer 204 via cable 249 and to switch 216 by cable 251 and to switch 208 by cable 253.

Power source 244 is connected to master switch 245 by cable 254 branching from cable 253.

In operation the external fluid such as the city cold water enters the system through conduit 130, enters the heat exchanger 132 for the transformer 204 which includes a rectifier, then proceeds through conduit 136 into the heat exchanger 134 for the transformer 210 which also includes a rectifier. Then the water passes through conduit 140 into the heat exchanger 138 where it is warmed. The water then proceeds through conduit 142 into heat exchanger 141 and out of the heat exchanger 141 through conduit 158 through check valve 160 and through the booster heater 162 where it goes to the kitchen or elsewhere for use. This takes care of the heating of the cold water system.

The following is a description of the circulation of the coolant system for the refrigeration module network. The coolant will enter a recirculation system after it leaves the refrigeration heat exchanger 138 and enters the conduit 150. Then the coolant goes through the pump 151 and through the non-conductive coupling 236 into the intake manifold 148 and then proceeds through the conduit 156A and 156B and through the refrigeration module network 152. After the coolant leaves the module network it leaves by conduits 154A and 154B and enters the outlet manifold 144. Then, the coolant flows into the conduit 146 and through the non-conductive coupling 230 and continues through the conduit 146 through the three-way valve 198 and then back into the heat exchanger 138. This completes the normal cycle when the thermostat selected temperature for the heat exchanger 138 is not exceeded.

When the thermostatically selected temperature for the heat exchanger 138 is exceeded the three-way valve 198 automatically turns responsive to actuation by thermostat 255 associated with heat exchanger 138 diverting the coolant through the conduit 202 to the cooling tower 200 and then the coolant leaves the coolant tower by conduit 203 and re-enters the conduit 146 thereby completing the cycle.

The following is a description of the coolant system for the air conditioning module network. The coolant leaves the air conditioning heat exchanger 141 by conduit 170, then passes through pump 170a and through the non-conductive coupling 232. It continues through conduit 170 and then passes through the intake manifold 168, then through the conduits 173A and 173B into and through the air conditioning module network 171. It passes out the air conditioning module network 171 through conduits 172A and 172B, into the outflow manifold 164, through the non-conductive coupling 234 and into the conduit 166. The coolant then passes through the three-way valve 190 continues on through conduit 166, through the three-way valve 174, through conduit 175 into the heat exchanger for the swimming pool 176.

From the heat exchanger 176 a separate fluid heated by the coolant will flow through conduit 180 having check valve 182 and auxiliary heater 184 and into fluid reservoir swimming pool 178. The recirculation is completed by means of conduit 186 carrying fluid from fluid reservoir swimming pool 178 through pump 188 back to heat exchanger 176. Hence, excess heat developed by the modules is utilized to heat the swimming pool 178. The temperature of the swimming pool 178 is regulated by thermostatic selection so that if too much heat comes in via conduit 180 the coolant may be shut off by valve 174 and if not enough heat comes into the swimming pool via conduit 180 it may be heated to the desired temperature by auxiliary heater 184. The coolant goes through conduit 177 into conduit 166 and back into the heat exchanger 141.

When the thermostatically selected temperature for the fluid reservoir swimming pool 178 has been exceeded the three-way valve 174 is automatically actuated by thermostat 257 associated with pool 178 thereby diverting the coolant away from the swimming pool heat exchanger 176 so that the coolant then goes through heat exchanger 141. Heat exchanger 141 will also have a thermostat 259 so that if and when this selected temperature is exceeded then this thermostat automatically actuates three-way valve 190 so that the coolant proceeds through conduit 194 through the cooling tower 192, then through conduit 196 back into conduit 166.

When the air conditioning system is used for cooling the building the transformer 210 is used. This transformer 210 is also used throughout the year for the refrigeration module network 152. However, when the air conditioning module network 171 is being used to heat the building the transformer 204 is used. This transformer 204 will be at a higher voltage than the transformer 210 used for cooling or refrigeration. Therefore the transformer 204 would deliver power to the air conditioning module network 171 at a voltage sufficiently high so that the operating "cold" side of these modules would be approximately 200° F. or slightly under the boiling point of the distilled water which is used as a coolant. Such a transformer 204 is designed so that electrical power is delivered to the network 171 at near the maximum capacity of the modules, but less than the boiling point of the coolant.

The electricity from the transformer 210 goes to the refrigeration module network 152 through electrical cable 212 to connection 213 then through cable 220 where it connects to the conduit 150. The current then proceeds through conduits 156A and 156B through the module network 152, through conduits 154A and 154B through conduit 146, cable 218 and back to transformer 210 via cable 214. When the air conditioning network 171 is cooling the building the current leaves the transformer 210, goes through cable 212, through switch 216 to the connection 222 and then flows through cable 207 so as to connect to the conduit 170 at the point 224. The current then goes through conduits 173A and 173B into the air conditioning module network 171 and leaves the system via conduits 172A and 172B at the connection 228, proceeds along the cable 206 to the point 226 where it goes through the switch 216 then through cable 214 back to the transformer 210. Switch 216 is closed when the air conditioning system is cooling the building and when the air conditioning system is used for heating the building the direct current is reversed and the current comes from transformer 204 through cable 206 through switch 208, continues through cable 206 and connects up to the conduit system at 228. The current then goes through conduits 172A and 172B into air conditioning module network 171 and leaves through conduits 173A and 173B which is connected at 224 to cable 207. The current flows through the cable 207 to connection 222 and then through cable 205 and returns through the switch 208 back to the transformer 204. Switch 208 is closed when heating the building and switch 216 is open when heating the building. When cooling the building switch 216 is closed and switch 208 is open. A master switch 245 is thrown from cooling to heating when it is desired to heat the building or vice versa. The master switch 245 will do the following: it will disconnect the air conditioning module network 171 from the transformer 210 and connect it to transformer 204. It will also reverse the direction of flow of the direct current to the air conditioning module network 171 and simultaneously increase the voltage. The master switch is the only switch that needs to be thrown manually. All other switching can be done automatically by solenoid or other forms of power operation. The appropriate turning of valves as a result of excess temperature from the various heat exchangers and swimming pool is also done automatically. In other words, this system is completely automatic with the only exception being that when the building is changed from cooling to heating the master switch is thrown which effects the changes previously described.

Hence, in operation, due to the seasonal requirements for heating and cooling, ordinarily the excess thermal energy from the thermoelectric modules can be used to heat the swimming pool shown in FIGURE 17. More particularly, the fluid reservoir swimming pool and external fluid city water for other uses is heated during the winter by the relatively "cold" sides of the air conditioner modules plus the hot sides of the refrigeration modules, and in the summer by the hot sides of both module networks.

While I have herein shown and described my invention in what I have conceived to be the most practical and preferred embodiments, it is to be recognized that departures may be made therefrom within the scope of my invention, which is not to be limited to the details disclosed herein, but is to be accorded the full scope of the claims so as to embrace any and all equivalent devices, apparatus and methods.

What I claim is:

1. In a facility providing both refrigeration and hot water, a plurality of thermo-cooler units each comprising a thermoelectric module having opposite hot and cold sides, said cold sides being arranged so as to supplement each other for refrigerating an area, water circulation structure connected to the hot side of each module in heat conducting relationship thereto for circulating water through said structure so as to transfer heat from the hot side of the module to the water and thereby lower the temperature of both the cold and hot sides of the module and raise the temperature of the water, water inlet conduit means connected to said structures of said units for delivering water thereto, water outlet conduit means for receiving heated water from said structures, a water pump in said outlet conduit means, valve means connected to said inlet conduit means and to said water outlet conduit means downstream of the pump, said valve means having a first position in which it connects said outlet conduit means to said inlet conduit means to provide a closed water circulation system in which said pump circulates water through said outlet and inlet conduit means and through said structures of the thermo-cooler units, and a water supply line connected to said valve means, said valve means having a second position in which it closes off the connection between the outlet and inlet conduit means and connects said water supply line to the inlet conduit means so that water from said supply line will flow through said inlet conduit means and through said structures of the thermo-cooler units, and thence through said outlet conduit means.

2. Apparatus as defined in claim 1, wherein a warm water storage and cooling tank is disposed in said outlet conduit means which has a sufficient capacity to cool said thermo-cooler units when water from said tank is recirculated through them.

3. Apparatus as defined in claim 1, wherein a booster water heater is disposed in said outlet conduit means downstream of said valve means.

4. Apparatus as defined in claim 1, wherein said valve means is automatically actuated by pressure sensitive valve control means in said outlet conduit means, so that when said outlet conduit means is closed downstream of said valve means the relatively high pressure in the outlet conduit means will cause the valve means to be in its said first position, and so that when said outlet conduit means is open downstream of said valve means to withdraw heated water therefrom the relatively low pressure in the outlet conduit means will cause the valve means to be in its said second position.

5. The method of providing both refrigeration and heated liquid in a system, which comprises furnishing direct current electrical power to a first group of thermoelectric modules so that one area of each module becomes hot and another area of each module becomes cold, refrigeration being provided by said cold areas of the modules, circulating liquid adjacent to said hot areas of the modules in heat conducting relationship with said hot areas so as to cool said hot and cold areas of the modules and thereby assist the refrigeration and so as to heat the liquid to provide said heated liquid in the system, furnishing direct current electrical power of one polarity to a second group of thermoelectric modules so that an air conditioning area of each of the second group of modules becomes cold, and another area of each of the second group of modules becomes hot, circulating liquid adjacent to said hot areas of the second group of modules in heat conducting relationship with said hot areas so as to cool said hot areas and air conditioning areas of the second group of modules and so as to heat the liquid to supplement said heated liquid in the system, reversing the polarity of the electrical power furnished to said second group of modules so that said air conditioning areas of the second group of modules become hot and said other areas of the second group of modules become cold, circulating liquid adjacent to said other areas of the second group of modules in heat transferring relationship with said other areas to warm said other areas and further heat said air conditioning areas and to cool the liquid, and circulating this cooled liquid adjacent to the hot areas of the first-mentioned group of modules employed for refrigeration, so as to cool said hot areas and further cool the cold areas of the first group of modules and so as to heat said cooled liquid to provide said heated liquid in the system.

6. In a facility for providing both refrigeration and heated water, a plurality of thermo-cooler units each comprising a thermoelectric module having opposite hot and cold sides, said cold sides being arranged so as to supplement each other for refrigerating an area, and liquid circulation structure connected to the hot side of each module in heat conducting relationship thereto for circulating liquid coolant through said structure so as to transfer heat from the hot side of the module to the coolant and thereby lower the temperature of both the cold and hot sides of the module and raise the temperature of the coolant, said structures having inlet means for delivering coolant thereto and outlet means for receiving heated coolant therefrom, a liquid circuit connected at one of its ends to said outlet means and at its other end to said inlet means, whereby said liquid circuit, inlet means, structures and outlet means form a continuous, closed fluid path for the liquid coolant, a liquid pump in said circuit for continuously recirculating the liquid coolant through said fluid path, a heat exchanger connected to said circuit at a point remote from said thermo-cooler units, and a water supply line operatively connected to said heat exchanger so that heat energy will be transferred in said heat exchanger from the coolant to the water in said supply line, and D.C. electrical power supply means for providing operating current to said modules, said power supply means comprising a source of D.C. current, electrically conducting metal conduit constituting a substantial portion of said liquid circuit, said metal conduit being electrically isolated from the heat exchanger and from the liquid circulation structures of the thermo-cooler units by conduit sections composed of electrical insulation material, and by said liquid coolant being composed of an electrically non-conducting liquid, and electrical connections from said D.C. current source to said metallic conduit and from said metal conduit to said thermoelectric modules for providing D.C. operating current from said current source to the modules.

7. Apparatus as defined in claim 6, wherein said D.C. current source comprises a water-cooled transformer-rectifier unit operatively connected to said water supply line, whereby water in said supply line will cool the transformer-rectifier unit and will receive heat energy from the transformer-rectifier unit.

8. Apparatus as defined in claim 6, wherein said metal conduit includes both a substantial portion of said liquid circuit and a substantial portion of at least one of said inlet means and outlet means.

9. Apparatus as defined in claim 6, wherein said liquid circuit includes a first circuit portion extending from said outlet means to said heat exchanger and having said pump therein, and a second circuit portion extending from said heat exchanger to said inlet means, said metal conduit constituting a substantial extent of at least one of said circuit portions.

10. Apparatus as defined in claim 9, wherein said first and second portions both have a substantial extent thereof composed of said electrically conducting metal conduit, separate electrical connections of different polarity from said current source to the metal conduit sections of the first and second portions, respectively, and separate electrical connections from the metal conduit sections of the first and second portions to said thermoelectric modules for furnishing current to the modules.

11. Apparatus as defined in claim 10, wherein a substantial part of said outlet means is metal conduit connected to the metal conduit section of said first circuit portion, and a substantial portion of said inlet means is metal conduit connected to the metal conduit section of said second circuit portion.

12. A thermal control system using thermoelectric apparatus comprising:
(a) an inlet conduit through which an external fluid can communicate with a first heat exchanger for a heating operation transformer and rectifier, and can communicate with a second heat exchanger for a cooling operation transformer and rectifier, a third heat exchanger and a fourth heat exchanger which in turn communicates with a fluid outlet for the external fluid;
(b) said third heat exchanger being part of a closed fluid recirculation system which includes a thermoelectric refrigeration module network which has hot and relatively cold sides;
(c) said fourth heat exchanger being part of a closed fluid recirculation system which includes a thermoelectric air-conditioning module network which has hot and relatively cold sides, and a fluid reservoir heat exchanger which is in turn part of a separate fluid recirculation system which includes a fluid reservoir;
(d) cooling system electrical power means which is transmitted through the transformer and rectifier of the second heat exchanger and is connected so as to actuate the refrigeration module network and the air-conditioning module network;
(e) heating system electrical power means which is at a higher voltage than the cooling system electrical power means and which is transmitted through the transformer and rectifier of the first heat exchanger and is connected to actuate the air-conditioning module network by reversing the flow of electrical current through the air-conditioning module network so as to reverse the hot and relatively cold sides of said network;
(f) a master switch means for changing the thermal control system from a cooling operation where the electrical power means is connected as in paragraph (d) to a heating operation where the electrical power is connected as in paragraph (e) so that the air-conditioning module network is disconnected from the transformer and rectifier of the second heat exchanger and connected to the transformer and rectifier of the first heat exchanger and the direction of current through the air-conditioning module network is reversed; and
(g) means for circulating fluid within the conduits of the thermal control system so that during the cooling operation of the system the hot sides of both the refrigeration module network and the air-conditioning module network heat the fluid circulating through the fluid reservoir and the external fluid which passes out the fluid outlet and during the heating operation of the air-conditioning system the hot sides of the refrigeration module network and the relatively cold sides of the air-conditioning module network heat the fluid circulating through the fluid reservoir and the external fluid which passes out the fluid outlet.

13. A thermal control system using thermoelectric apparatus as defined by claim 12 wherein a thermostatically valve controlled means is provided so that a cooling tower can communicate with the closed fluid recirculation system which includes the third heat exchanger and a thermostatically valve controlled means is provided so that a cooling tower can communicate with the closed fluid recirculation which includes the fourth heat exchanger.

14. A thermal control system using thermoelectric apparatus as defined by claim 13 wherein thermostatically actuated valve means are provided to limit the flow of fluid within the closed recirculation system of which the fourth heat exchanger is a part so that there is no communication within the system between the heat reservoir and the recirculation system.

15. In a facility for providing refrigeration, air-conditioning and heated fluid:
(a) a plurality of thermo-cooler units each comprising a thermoelectric module having hot and cold sides, said cold sides being arranged so as to supplement each other for refrigerating an area, and fluid circulation structure connected to the hot side of each module in heat conducting relationship thereto for circulating fluid coolant through said structure so as to transfer heat from the hot side of the module to the coolant thereby to lower the temperature of both the cold and hot sides of the module and raise the temperature of the coolant, said structures having inlet means for delivering coolant thereto and outlet means for receiving coolant therefrom, a fluid circuit connected at one of its ends to said outlet means and at its other end to said inlet means, whereby said fluid circuit, inlet means, structures and outlet means form a continuous, closed fluid path for the fluid coolant, a fluid pump in said circuit for continuously recirculating the fluid coolant through said fluid path, a heat exchanger connected to said circuit at a point remote from said thermo-cooler units, and a fluid supply line operatively connected to said heat exchanger so that heat energy will be transferred in said heat exchanger from the coolant to the fluid in said supply line, and D.C. electrical power supply means for providing operating current to said modules, said supply means comprising a source of D.C. current, electrically conducting metal constituting a substantial portion of said fluid circuit, said metal conduit being electrically isolated from the heat exchanger and from the liquid circulation structures of the thermo-cooler units by conduit sections composed of electrical insulation material, and by said fluid being composed of an electrically non-conducting fluid, and electrical connections from said D.C. current source to said metallic conduit and from said metal conduit to said thermoelectric modules for providing D.C. operating current from said current source to the modules;

(b) a plurality of thermo-cooler units for air-conditioning an area operatively associated with a separate recirculating fluid circuit as in (a) but which is provided with means for fluid communication with the circuit defined by (a) wherein the D.C. electrical power supply for operating the modules can be reversed and increased in voltage;
(c) a master switch electrical control means which can reverse and increase the electrical voltage to the thermo-cooler units for air-conditioning as defined in (b);
(d) a fluid reservoir thermally associated with the recirculating fluid circuit system of (b) by means of a heat exchanger so as to be able to receive heat from the circulating coolant;
(e) and an external fluid inlet and outlet means thermally associated with the fluid circuit systems of (a) and (b) by means of heat exchangers so as to be able to heat a predetermined amount of external fluid.

16. A method of providing cooling and heating in recirculating fluid systems comprising furnishing reversible direct current electrical power to at least some of a plurality of thermoelectric modules within the recirculating fluid systems so that one area of each module becomes hot and another area of each module becomes relatively cold thereby causing a cooling effect to be provided by said cold areas of the modules, circulating fluid within the system adjacent to said hot areas of the modules in heat conducting relationship with said hot areas so as to cool said hot and cold areas of the modules and to heat the fluid so as to provide heated fluid in the system, circulating said heated fluid so as to provide heat to a heat reservoir and an external fluid by means of heat exchangers, reversing the direction of said direct current when a predetermined amount of cooling has been effected thereby deleting the cooling effect from the system provided by the modules in which the current has been reversed, and simultaneously increasing the current to the modules when the current has been reversed so that an increased amount of heated fluid is provided in the system.

References Cited by the Examiner

UNITED STATES PATENTS

| | | | |
|---|---|---|---|
| 484,182 | 10/1892 | Dewey | 62—3 |
| 1,874,803 | 8/1932 | Reed | 165—29 |
| 2,291,023 | 7/1942 | Burklin | 126—362 |
| 2,516,094 | 7/1950 | Ruff | 165—29 |
| 2,544,408 | 3/1951 | Whitney et al. | 126—362 |
| 2,837,899 | 6/1958 | Lindenblad | 62—3 |
| 2,910,836 | 11/1959 | Karrer | 62—3 |
| 2,928,253 | 3/1960 | Lopp et al. | 62—3 |
| 2,932,953 | 4/1960 | Becket et al. | 62—3 |
| 2,938,357 | 5/1960 | Sheckler | 62—3 |
| 2,947,150 | 8/1960 | Roeder | 62—3 |
| 2,949,014 | 8/1960 | Roeder | 62—3 |
| 3,137,142 | 6/1964 | Venema | 62—3 |
| 3,178,894 | 4/1965 | Mole et al. | 62—3 |

JAMES W. WESTHAVER, *Primary Examiner.*

FREDERICK L. MATTESON, *Assistant Examiner.*